United States Patent
Agrawal et al.

(10) Patent No.: US 6,763,190 B2
(45) Date of Patent: Jul. 13, 2004

(54) NETWORK AUTO-PROVISIONING AND DISTRIBUTED RESTORATION

(75) Inventors: Niraj Agrawal, Hammelburg (DE); John M. Hitchcock, Ames, IA (US); Neil A. Jackman, Freehold, NJ (US); Steven K. Korotky, Toms River, NJ (US); Eric S. Tentarelli, Middletown, NJ (US); Liyan Zhang, Columbia, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 456 days.

(21) Appl. No.: 09/755,613

(22) Filed: Jan. 5, 2001

(65) Prior Publication Data

US 2004/0105383 A1 Jun. 3, 2004

(Under 37 CFR 1.47)

Related U.S. Application Data

(60) Provisional application No. 60/186,777, filed on Mar. 3, 2000.

(51) Int. Cl.[7] ............................ H04J 14/00; H04L 12/26
(52) U.S. Cl. ................................ 398/5; 398/1; 370/216
(58) Field of Search ........................... 398/3–5, 10, 12, 398/13, 17, 19, 22–24, 33, 49, 50, 56, 57, 59; 370/216, 227, 228, 222, 223, 224, 254, 258

(56) References Cited

U.S. PATENT DOCUMENTS

| | | | | |
|---|---|---|---|---|
| 5,884,017 A | * | 3/1999 | Fee | 714/4 |
| 5,914,798 A | * | 6/1999 | Liu | 398/7 |
| 6,233,072 B1 | * | 5/2001 | Liu et al. | 398/5 |
| 6,324,162 B1 | * | 11/2001 | Chaudhuri | 370/225 |
| 6,377,374 B1 | * | 4/2002 | Davis et al. | 398/82 |

OTHER PUBLICATIONS

"Optical Network Design and Restoration" by Bharat T. Doshi et al., Bell Labs Technical Journal. vol. 4, No. 1, Jan.–Mar. 1999, pp. 58–84.

* cited by examiner

*Primary Examiner*—Leslie Pascal
*Assistant Examiner*—Dalzid Singh

(57) ABSTRACT

In a telecommunications network, such as an optical mesh network, satisfying a demand from a start node to an end node, the network is automatically provisioned from a service path to a restoration path after a failure occurs in the service path. Each affected node in the network eventually receives an indication of the occurrence of the failure in the service path. If the node is an intermediate node of the service path, then the node transmits a failure message to its next node along the service path. If the node is the end node of the service path, then the node transmits a restore message to its previous node along the restoration path. If the node is an intermediate node of the restoration path, then the node transmits a restore message to its previous node along the restoration path. In addition, the node reconfigures its cross-connect for the transition from the service path to the restoration path.

26 Claims, 6 Drawing Sheets

NETWORK AUTO-PROVISIONING AND DISTRIBUTED RESTORATION

CROSS-REFERENCE TO RELATED APPLICATIONS

This application claims the benefit of the filing date of U.S. provisional application No. 60/186,777, filed on Mar. 03, 2000.

BACKGROUND OF THE INVENTION

1. Field of the Invention

The present invention relates to telecommunications, and, in particular, to provisioning for the restoration of service in distributed optical telecommunication networks.

2. Description of the Related Art

Rapid advances in optical networking are expected to provide network operators with new tools such as optical-layer restoration (OLR) at relatively low cost to enhance the reliability and versatility of transport networks. With the availability of large optical cross-connects, OLR for mesh networks would provide a very attractive solution for restoration of large optical networks. OLR should support services with heterogeneous data network platforms and be transparent to data line-card bit rate. Due to the omnipresence of SONET (Synchronous Optical NETwork) rings and their associated fast protection/restoration, network operators now expect mesh restoration to be "ring competitive," which implies a mesh restoration speed of a few hundred milliseconds as well as highly efficient sharing of restoration capacity among various links. While rings require an excess capacity of 100%, mesh restoration requires only 40–70%. Thus, shared mesh restoration would offer the potential of huge savings for the network operator.

A prototypical fiber transport mesh network for the continental United States may consist of about 100 nodes and over 170 links, where each link is capable of carrying optical signals in either direction between two corresponding nodes. In a WDM (wavelength division multiplexing) optical network, each link comprises one or more unidirectional and/or bidirectional optical fibers, each of which is capable of carrying multiple optical signals at different wavelengths.

Each node in such a mesh network may be configured with one or more optical cross connects (OXCs) that enable individual optical signals to be dropped, added, or continued. A dropped signal is received at a node from another node and transmitted to a local customer of the node. An added signal is received at a node from a local customer and transmitted to another node. A continued signal is received at a node from another node and transmitted to yet another node.

Provisioning refers to the process of configuring the cross-connects in the nodes of a network for a new demand to be satisfied by the network or the deletion of an existing demand, where the term "demand" refers to a unidirectional transmission of signals from a start node to an end node in the network, possibly through one or more intermediate nodes. The path from the start node to the end node that satisfies the demand is referred to as the service path. In addition to being able to satisfy new demands and delete existing demands, a robust network should also be able to perform automatic provisioning to restore communications to satisfy a demand after the occurrence of a failure in a link along the service path for that demand. In particular, the network should be able to detect the existence of the failure and automatically reconfigure the cross-connects in the nodes of the network as needed to restore communications to satisfy the demand within a reasonable period of time (e.g., within a few hundred msec of the failure if not quicker) along a path, referred to as a restoration path, that bypasses the failed link.

SUMMARY OF THE INVENTION

The present invention is directed to techniques for the detection and communication of failures in networks, such as optical mesh networks, to enable automatic restoration of communications.

In one embodiment, the present invention is, at a node of a telecommunications network satisfying a demand from a start node to an end node, a method for automatically provisioning the network from a service path to a restoration path after a failure occurs in the service path, comprising the steps of (a) receiving, at the node, an indication of the occurrence of the failure in the service path; (b) if the node is an intermediate node of the service path, then transmitting, by the node, a failure message to its next node along the service path; (c) if the node is the end node of the service path, then transmitting, by the node, a restore message to its previous node along the restoration path; and (d) if the node is an intermediate node of the restoration path, then transmitting, by the node, a restore message to its previous node along the restoration path.

In another embodiment, the present invention is a node for a telecommunications network, comprising (a) a cross-connect connected to a plurality of input ports and a plurality of output ports and configurable to connect incoming payload signals received at an input port to outgoing payload signals transmitted at an output port; and (b) an operating system configured to receive an indication of an occurrence of a failure in a service path satisfying a demand from a start node to an end node, wherein, in order to automatically provision the network from the service path to a restoration path for the demand:

if the node is an intermediate node of the service path, then the operating system causes the node to transmit a failure message to its next node along the service path;

if the node is the end node of the service path, then the operating system causes the node to transmit a restore message to its previous node along the restoration path; and if the node is an intermediate node of the restoration path, then the operating system causes the node to transmit a restore message to its previous node along the restoration path.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention is applicable to an arbitrary mesh network. For concreteness, however, the present invention is described below in the context of particular exemplary networks.

Figure 1:
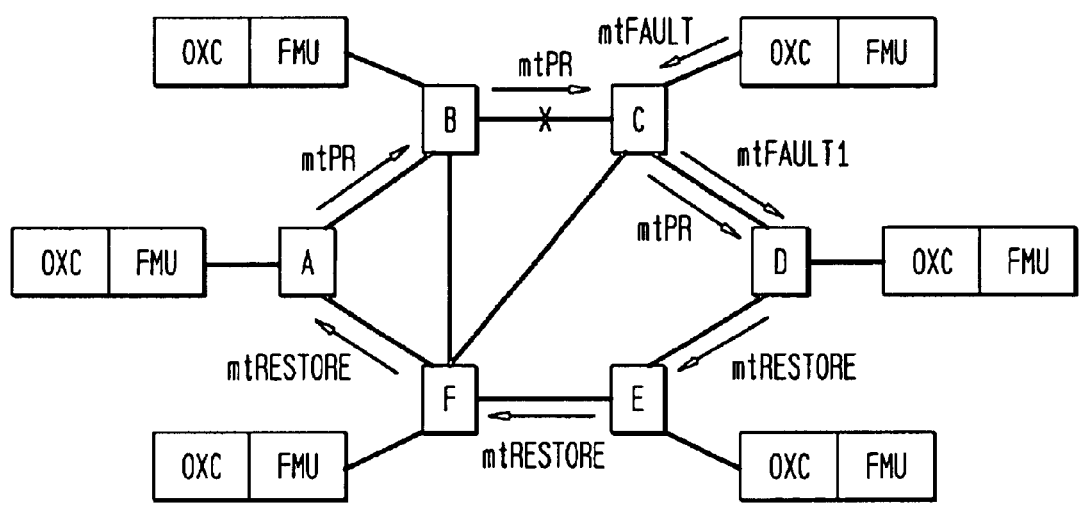
FIG. 1 shows a portion of an optical network comprising six nodes and eight links.

FIG. 1 shows a portion of an optical network 100 comprising six nodes A, B, C, D, E, and F and eight links (AB), (AF), (BC), (BF), (CD), (CF), (DE), and (EF). Each node is configured with an optical cross-connect (OXC), which performs the node's signal add/drop/continue functions, and a fault monitoring unit (FMU), which is responsible for fault detection and service restoration processing for the node.

In network 100, the demand (A, D) refers to the transmission of optical signals (also referred to as the payload) from start node A to end node D. In the example of FIG. 1, the service path for the demand (A, D) is the path (ABCD), corresponding to transmission of the payload from start node A through intermediate node B through intermediate node C to end node D.

In addition to the service path, one or more restoration paths are determined for each demand as backup paths in case of a failure in the service path. Different types of failures are possible. One type of failure corresponds to a single wavelength when, for example, a particular laser fails, where the other wavelengths on the affected fiber are still operative. Another type of failure corresponds to a single fiber when, for example, a particular fiber is cut, where the other fibers in the affected link are still operative. Yet another type of failure corresponds to an entire link when, for example, a particular multi-fiber cable is cut, where the other links in the network are still operative.

Depending on the type of failure, different types of restoration are possible. For example, when a particular wavelength fails, restoration may be provided by another wavelength in the same fiber, by another fiber in the same link, or by one or more other links in the network. Similarly, when a particular fiber fails, restoration may be provided by another fiber in the same link or by one or more other links in the network. And when a particular link fails, restoration may be provided by one or more other links in the network.

For any type of failure, when restoration is provided by one or more other links in the network, the restoration may be path-based or link-based. In path-based restoration, the restoration path is independent of where along the service path the failure occurs. In link-based restoration, the restoration path may be different depending on the particular link in which the failure occurs. Consider, for example, service path (ABCD) of FIG. 1. Under path-based restoration, the restoration path for service path (ABCD) is the path (AFED) no matter whether the failure occurs in link (AB), (BC), or (CD). Under link-based restoration, however, the restoration path may be different depending on the particular link in which the failure occurs. For example, the restoration path for a failure in link (AB) of service path (ABCD) may be the path (AFBCD), the restoration path for a failure in link (BC) may be the path (ABFCD), and the restoration path for a failure in link (DC) may be the path (ABCFED). In general, for path-based restoration, each service path has a single restoration path, while, for link-based restoration, each service path may have one or more restoration paths, where failures in different links along the service path may have different restoration paths. Although the present invention may be implemented in the context of either path-based restoration or link-based restoration, path-based restoration is preferred, because there is no need to identify the particular link in the service path in which a failure occurs.

In general, the determination of restoration paths can be made prior to or after the occurrence of a failure. In order to accelerate restoration processing, in preferred embodiments of the present invention, the restoration paths are pre-computed and relevant information is stored in a database at each node.

For the present invention, path computation may be centralized or distributed, although centralized path computation is preferred. In centralized path computation, a centralized network server is responsible for determining the service and restoration paths for all existing network demands, where the network server is responsible for communicating information about those paths to the appropriate nodes. In distributed path computation, each node performs analogous path computation processing in a distributed manner to determine the service and restoration paths for each demand.

In general, the signaling used to convey restoration and auto provisioning information between the network server and individual nodes and between the nodes themselves may be transmitted using either in-band or out-of-band channels, where the out-of-band signaling may be implemented using either electrical or optical signals. For example, the signaling may be implemented using out-of-band electrical or optical signaling relying on a socket-based TCP/IP protocol.

FIG. 1 illustrates the distributed mesh restoration and auto provisioning protocol, according to one embodiment of the present invention. In this example, the service path for the demand (A, D) is the path (ABCD) and the pre-computed restoration path is the path (AFED). A distributed network operating system (DNOS), running on each node, handles all network management including provisioning and restoration, using a separate thread for each demand. During system initialization, the DNOS at each node reads from its database the pre-computed service and restoration paths and all link and port mapping information indicating which links and wavelengths are available for communication to neighboring nodes over which port numbers. For each demand supported by a node, the node's database contains at least the following information:

Whether the node is the StartNode, the EndNode, or an IntermediateNode for the demand. Note that, for path-based restoration, the same two nodes will be the StartNode and the EndNode for both the service and restoration paths, but a node will be an IntermediateNode for either only the service path or only the restoration path.

The NextNode for each of the service and restoration paths (when the node is the StartNode for the demand), the NextNode and the PreviousNode (when the node is an IntermediateNode for the demand), or the PreviousNode for each of the service and restoration paths (when the node is the EndNode for the demand).

The input and output ports to be used for the demand. Note that the output port for the StartNode for the demand will differ for the service and restoration paths corresponding to the two different NextNodes for those two paths. Similarly, the input port for the EndNode for the demand will differ for the service and restoration paths corresponding to the two different PreviousNodes for those two paths.

Each node in network 100 of FIG. 1 is configured to perform the following processing to initially provision a service path:

When a node is the StartNode for a particular demand, the node's DNOS initiates provisioning of the service path for that demand by sending a special provision message mtPR to its NextNode along the service path for the demand. In addition, the DNOS configures its cross-connect based on the input and output ports designated for that service path.

When a node's DNOS receives an mtPR message for a particular demand from another node, the DNOS determines whether it is an IntermediateNode or the EndNode for that demand. If it is an IntermediateNode, then the DNOS passes the mtPR message to its NextNode along the service path for the demand. In either case, the DNOS configures its cross-connect based on the input and output ports designated for that service path.

Figure 2:
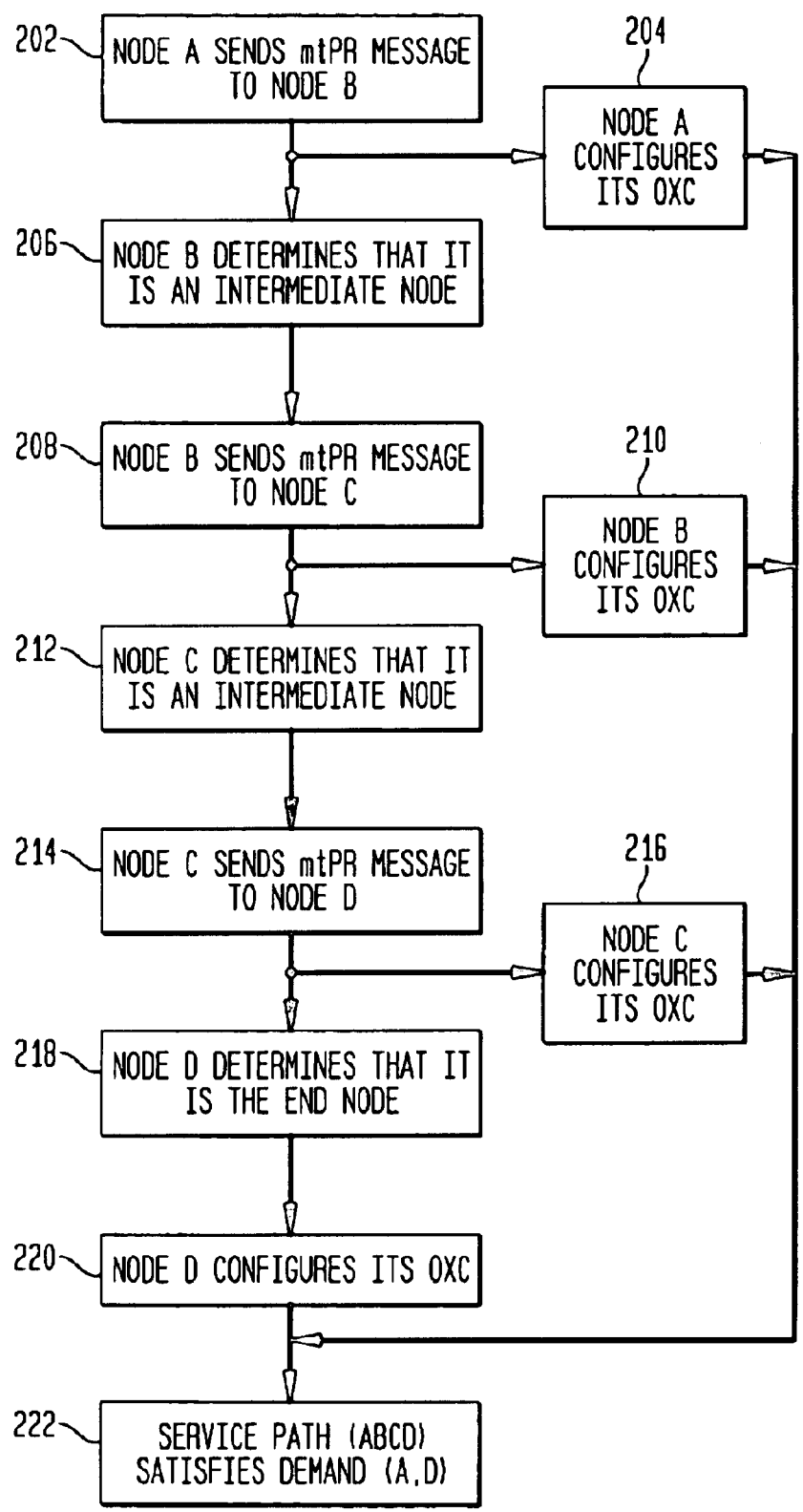
FIG. 2 shows a flow diagram of exemplary processing implemented to provision the service path (ABCD) in the network of FIG. 1 for the demand (A, D)

FIG. 2 shows a flow diagram of exemplary processing implemented to provision the service path (ABCD) in network 100 of FIG. 1 for the demand (A, D). In particular, the StartNode (Node A) initiates the provisioning of service path (ABCD) for the demand (A, D) by sending an mtPR message to its NextNode (Node B) along the service path (ABCD) for the demand (A, D) (step 202 in FIG. 2) and configures its cross-connect based on the input and output ports (corresponding to link (AB)) designated in its database for the service path (ABCD) (step 204).

When the DNOS at node B receives the mtPR message for the demand (A, D) from node A, the DNOS determines that it is an IntermediateNode for that demand (step 206). The DNOS passes the mtPR message to its NextNode (node C) along the service path (ABCD) for the demand (A, D) (step 208) and configures its cross-connect based on the input and output ports (corresponding to links (AB) and (BC)) designated in its database for that service path (step 210).

When the DNOS at node C receives the mtPR message for the demand (A, D) from node B, the DNOS determines that it is an IntermediateNode for that demand (step 212). The DNOS passes the mtPR message to its NextNode (node D) along the service path (ABCD) for the demand (A, D) (step 214) and configures its cross-connect based on the input and output ports (corresponding to links (BC) and (CD)) designated in its database for that service path (step 216).

When the DNOS at node D receives the mtPR message for the demand (A, D) from node C, the DNOS determines that it is the EndNode for that demand (step 218). The DNOS configures its cross-connect based on the input and output ports (corresponding to link (CD)) designated in its database for that service path (step 220).

As indicated in FIG. 2, the different nodes along the service path configure their cross-connects in parallel, with each node performing its own cross-connects without waiting for any other node. After all of the cross-connects are made in all of the nodes, the service path (ABCD) is configured to satisfy the demand (A, D) (step 222).

Note that, for typical network operations, in addition to the unidirectional demand (A, D), a corresponding unidirectional demand (D, A) will also be desired to provide bidirectional communications between nodes A and D. The provisioning of the service path for the demand (D, A) is implemented using provisioning processing analogous to that shown in FIG. 2 for the demand (A, D). Note that the service path for the demand (D, A) may, but does not have to, involve the same links and nodes as the service path for the demand (A, D) (and likewise for the restoration paths for the demands (A, D) and (D, A)).

Each node in network 100 is also configured to perform the following fault detection and auto provisioning processing:

When a fault is detected by a node's fault monitoring unit, the FMU sends a special internal fault message mtFault to the node's DNOS. As described earlier, a fault may correspond to a single wavelength, a single fiber, or an entire link. For purposes of this discussion, the fault will be assumed to correspond to a single wavelength (and therefore to a single demand) and restoration is assumed to be path-based. The principles involved can also be extended to path-based restoration of fiber and link faults.

When a node's DNOS receives an mtFault message from its own FMU, the DNOS determines whether it is an IntermediateNode or the EndNode along the service path for the demand. If the node is an IntermediateNode along the service path for the demand, the DNOS transmits an out-of-band mtFault1 message on to its NextNode along the service path for the demand. If the node is the EndNode for the demand, the DNOS passes a special restoration message miRestore to its PreviousNode along the restoration path for the demand. In that case, the DNOS also proceeds to reconfigure its cross-connect from the input port for the service path to the input port designated in its database for the restoration path for the demand.

When a node's DNOS receives an mtFault1 message for a particular demand from another node, the DNOS determines whether it is an IntermediateNode or the EndNode along the service path for the demand. If the node is an IntermediateNode along the service path for the demand, then the DNOS passes the mtFault1 message on to its NextNode along the service path for that demand. If the node is the EndNode for the demand, then the DNOS passes an mtRestore message to its PreviousNode along the restoration path for the demand. In that case, the DNOS also proceeds to reconfigure its cross-connect from the input port for the service path to the input port designated in its database for the restoration path for that demand.

When a node's DNOS receives an mtRestore message for a particular demand from another node, the DNOS determines whether it is an IntermediateNode or the StartNode along the restoration path for the demand. If the node is an IntermediateNode along the restoration path for the demand, then the DNOS passes the miRestore message to its PreviousNode along the restoration path for the demand. In that case, the DNOS also proceeds to configure its cross-connect for the input and output ports designated in its database for the demand. If the node is the StartNode for the demand, then the DNOS reconfigures its cross-connect from the output port for the service path to the output port designated in its database for the restoration path for the demand.

Figure 3:
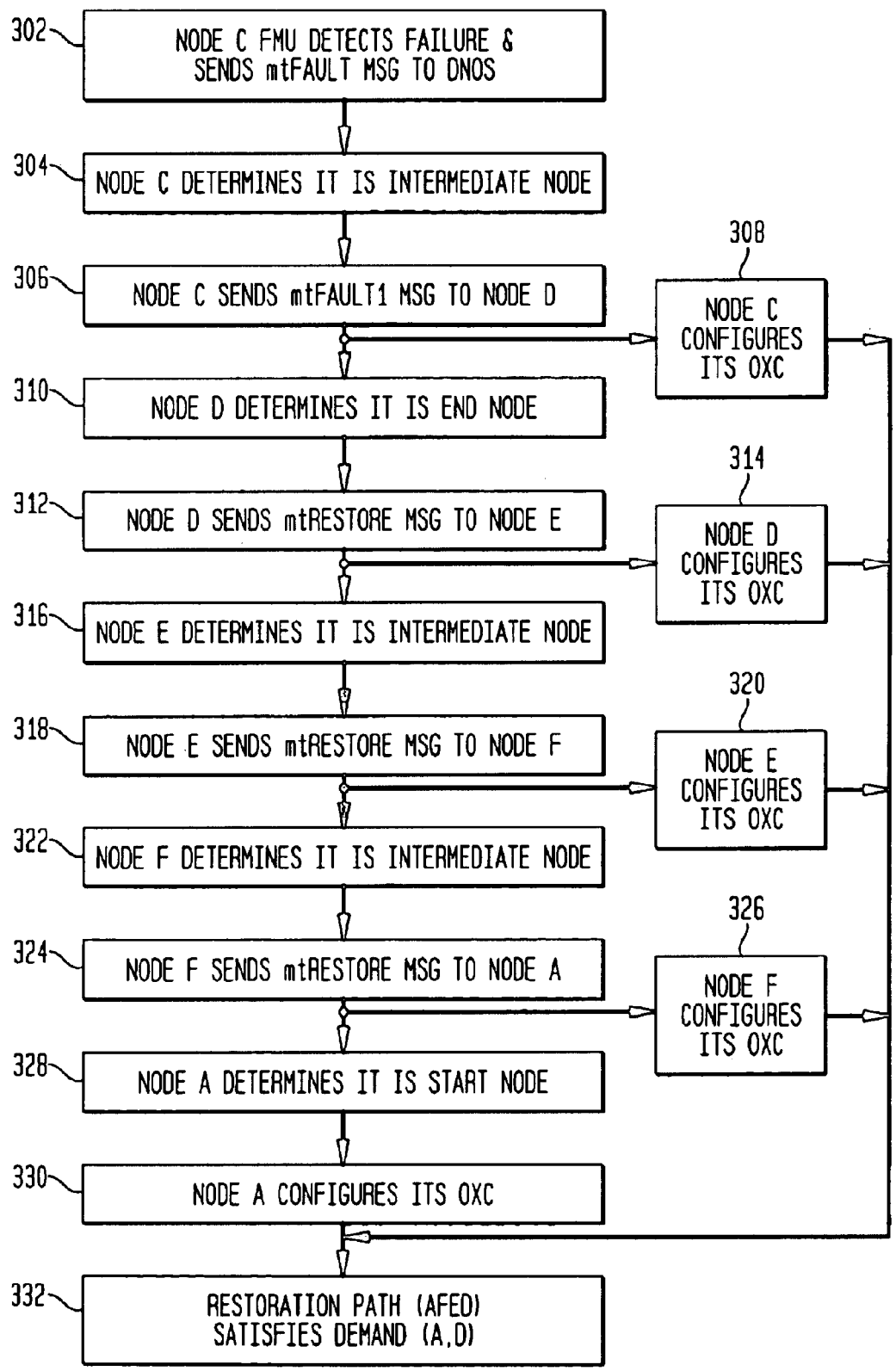
FIG. 3 shows a flow diagram of exemplary processing implemented when a failure occurs in the link (BC) along the service path (ABCD) in the network of FIG. 1 corresponding to the wavelength used by the link (BC) for the demand (A, D)

FIG. 3 shows a flow diagram of exemplary processing implemented when a failure occurs in the link (BC) along the service path (ABCD) in network 100 of FIG. 1 corresponding to the wavelength used by the link (BC) for the demand (A, D). In particular, the FMU at node C will detect the failure and transmit an mtFault message to the DNOS at node C (step 302). When the DNOS at node C receives the mtFault message from its own FMU, the DNOS determines that it is an IntermediateNode along the service path (ABCD) for the demand (A, D) (step 304). The DNOS at node C transmits an mtFault1 message on to its NextNode (node D) along the service path (ABCD) for the demand (A, D) (step 306) and proceeds to remove its cross-connect for the demand (A, D) (step 308).

When the DNOS at node D receives the mtFault1 message for the demand (A, D) from node C, the DNOS determines that it is the EndNode along the service path (ABCD) for that demand (step 310). The DNOS passes an mtRestore message to its PreviousNode (node E) along the restoration path (AFED) for the demand (A, D) (step 312) and reconfigures its cross-connect from the input port (corresponding to link (CD)) for the service path (ABCD) to the input port (corresponding to link (ED)) designated in its database for the restoration path (AFED) for that demand (step 314).

When the DNOS at node E receives the miRestore message for the demand (A, D) from node D, the DNOS determines that it is an IntermediateNode along the restoration path (AFED) for that demand (step 316). The DNOS passes the miRestore message to its PreviousNode (node F) along the restoration path (AFED) for that demand (step 318) and configures its cross-connect for the input and output ports (corresponding to links (FE) and (ED)) designated in its database for that demand (step 320).

Similarly, when the DNOS at node F receives the mtRestore message for the demand (A, D) from node E, the DNOS determines that it is an IntermediateNode along the restoration path (AFED) for that demand (step 322). The DNOS passes the mtRestore message to its PreviousNode (node A) along the restoration path (AFED) for that demand (step 324) and configures its cross-connect for the input and output ports (corresponding to links (AF) and (FE)) designated in its database for that demand (step 326).

When the DNOS at node A receives the mtRestore message for the demand (A, D) from node F, the DNOS determines that it is the StartNode for that demand (step 328) and the DNOS reconfigures its cross-connect from the output port (corresponding to link (AB)) for the service path (ABCD) to the output port (corresponding to link (AF)) designated in its database for the restoration path (AFED) for that demand (step 330).

As in the case of service path provisioning, during auto provisioning, as indicated in FIG. 3, each node along the restoration path configures its cross-connect in parallel without waiting for any other nodes. After all of the cross-connects are made in all of the nodes, the restoration path (AFED) is configured to satisfy the demand (A, D) (step 332). Once the restoration path begins to satisfy the demand, that restoration path can be considered to be the new service path and the centralized network server can proceed to compute a new restoration path for the new service path in light of the current (diminished) network capacity.

Note that, as described earlier, for typical network operations, in addition to the unidirectional demand (A, D), the network will also be provisioned with a corresponding unidirectional demand (D, A) to provide bidirectional communications between nodes A and D. As noted above, the service path for the demand (D, A) may or may not involve the same links and nodes as the service path for the corresponding demand (A, D). Even if the service path for the demand (D, A) does involve the same links and nodes as the service path for the demand (A, D) (i.e., the service path for the demand (D, A) is (DCBA)), the failure in the link (BC) that affects the service path (ABCD) for the demand (A, D) may or may not affect the service path (DCBA) for the demand (D, A), depending on the type of failure that occurs. If the failure in the link (BC) does affect the service path (DCBA), then the failure will be detected by node B for the demand (D, A) (in addition to node C detecting the failure for the demand (A, D)) and analogous processing will be performed to provision the network for the restoration path for the demand (D, A), which may or may not be the path (DEFA). In general, both the initial service path provisioning processing and the fault detection and restoration path auto provisioning processing are handled independently for each unidirectional demand.

Figure 4:
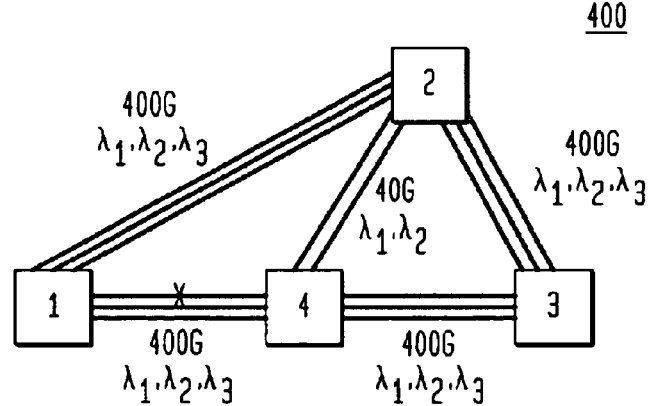
FIG. 4 shows a WDM optical network comprising four nodes 1–4 and five bidirectional links.

FIG. 4 shows a WDM optical network 400 comprising four nodes 1–4 and five bidirectional links. Network 400 was constructed to investigate the performance of the distributed mesh restoration technique of the present invention. Links (12), (14), (23), and (34) are based on the WaveStar™ 400G optical line system, which supports 80 wavelengths, and link (24) is based on a WaveStar™ 40G optical line system, which supports 16 wavelengths, both of Lucent Technologies Inc. of Murray Hill, N.J.

The topology of network 400 supports up to 12 different unidirectional 2.5 Gb/s demands corresponding to the six different combinations of pairs of nodes in network 400. Both heuristic and exhaustive graph-searching algorithms were used to determine the additional channel capacity required for restoration for each link under the assumption of a failure of a single wavelength in a single link. As shown in FIG. 4, links (12), (14), (23), and (34) require three channels (i.e., wavelengths) each in each direction, while link (24) requires two channels in each direction.

Table 1 shows the pre-computed service and restoration paths for six different unidirectional demands, evaluated under the constraints of node and link disjointness and minimum additional capacity. The four optical cross-connects that were used for this investigation (two (11×11) OXCs for nodes 2 and 4 and two (9×9) OXCs for nodes 1 and 3) were obtained by partitioning a partially provisioned (128×128) MEMS (Micro-Electro-Mechanical System) OXC prototype whose switching time is about 5 ms. A total of 40 input and 40 output ports were used in this investigation.

TABLE I

| Demand | Service Path | Restoration Path |
|---|---|---|
| (1, 2) | (12) | (142) |
| (1, 3) | (143) | (123) |
| (1, 4) | (14) | (124) |
| (2, 3) | (23) | (243) |
| (2, 4) | (24) | (214) |
| (3, 4) | (34) | (324) |

Figure 5:
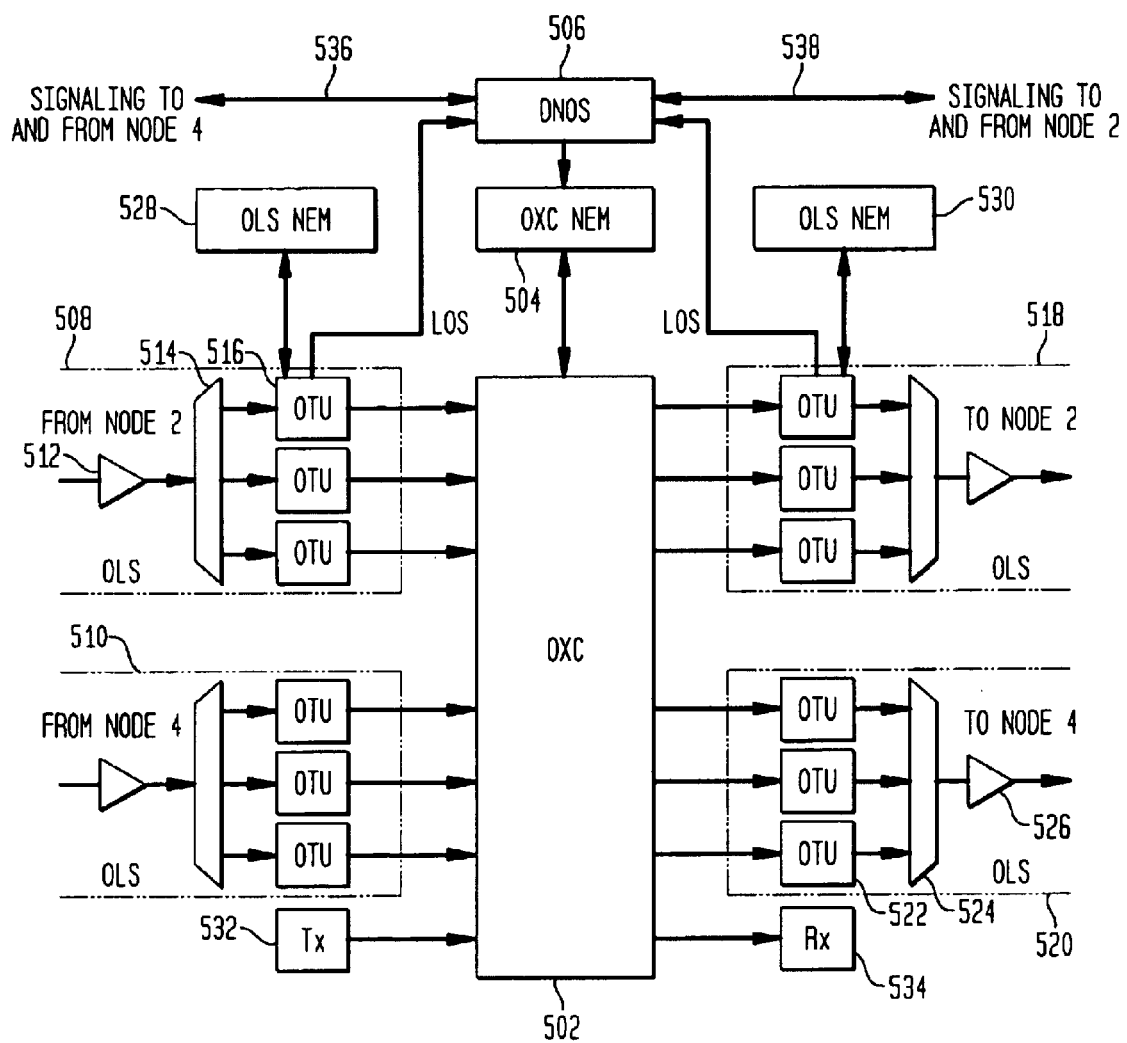
FIG. 5 shows a block diagram of the system architecture for node 1 of the network of FIG. 4.

FIG. 5 shows a block diagram of the system architecture for node 1 of network 400 of FIG. 4. Each of the other three nodes of network 400 have an analogous architecture. At the heart of node 1 is optical cross-connect (OXC) 502, which operates under control of distributed network operating system (DNOS) 506 via OXC NEM (Network Element Manager) 504. OXC 502 is configured to two input OLSs (Optical Line Systems) 508 and 510, each of which has an optical amplifier 512 configured to an optical demultiplexer 514, which is configured to three input optical translator units (OTUs) 516. OXC 502 is also configured to two output OLSs 518 and 520, each of which has three output OTUs 522 configured to an optical multiplexer 524, which is configured to an optical amplifier 526. The two input OLSs 508 and 510 are configured to an input OLS NEM 528, which controls the input OLSs, and the two output OLSs 518 and 520 are configured to an output OLS NEM 530, which controls the output OLSs. In addition, OXC 502 is configured to a transmitter 532 and a receiver 534, which handle the communications with the local customers of node 1. In particular, transmitter 532 transmits signals received from node 1's local customers to OXC 502 and receiver 534 receives signals from OXC 502 for node 1's local customers.

As indicated in FIG. 4, node 1 is configured to communicate with both nodes 2 and 4. As shown in FIG. 5, to enable these communications, input OLS 508 is configured to receive incoming optical signals from node 2, input OLS 510 is configured to receive incoming optical signals from node 4, output OLS 518 is configured to transmit outgoing optical signals to node 2, and output OLS 520 is configured to transmit outgoing optical signals to node 4. Out-of-band signaling between DNOS 506 and node 4 is handled via channel 536, while out-of-band signaling between DNOS 506 and node 2 is handled via channel 538, where channels 536 and 538 are 10/100BASE-T Ethernet signaling channels.

In particular, WDM signals from nodes 2 and 4 are amplified by amplifiers 512, demultiplexed by demuxes 514, regenerated by the corresponding input OTUs 516, and passed to OXC 502. The outgoing optical signals from OXC 502 are passed to output OTUs 522, multiplexed by muxes 524, amplified by amplifiers 526, and transmitted to nodes 2 and 4. The input and output OTUs provide SONET 3R signal regeneration, wavelength translation, and performance monitoring.

Each OTU performs fault detection processing by monitoring its optical signals to detect a loss-of-signal condition corresponding to a failure in the corresponding channel. When a failure occurs on a particular channel, the corresponding input OTU detects the fault, and the node's FMU detects a corresponding voltage change at the input OTU and transmits an mtFault message to DNOS 506. In one implementation, each input OTU performs fault detection processing by tapping off a portion of its incoming optical signal, converting it to an electrical signal (e.g., using a photodiode), and measuring the voltage level of the electrical signal. An LOS condition is determined when the voltage level falls below a specified threshold level. In another implementation, the electrical signal is decoded, for example, using a clock and data recovery (CDR) circuit with an LOS detector performing the fault detection processing. Those skilled in the art will understand that analogous fault detection processing could be implemented in the output OTUs, either in addition to or instead of the processing in the input OTUs.

Upon receipt of an mtFault message from an input OTU, DNOS 506 accesses its database to determine the appropriate action for the failed service path. If the node is an IntermediateNode for the failed service path, then DNOS 506 transmits an mtFault1 message to its NextNode along the service path via the corresponding out-of-band signaling channel. If the node is the EndNode for the failed service path, then DNOS 506 transmits an miRestore message to its PreviousNode along the corresponding restoration path for the demand via the corresponding out-of-band signaling channel. In the case of an IntermediateNode, in addition to reporting LOS to DNOS 506, even though the OTU does not receive a valid signal, nevertheless, it transmits a valid signal (having no data) to its NextNode, where, in the case of SONET signals, the OTU injects an AIS (Alarm Indication Signal) into the SONET payload.

As such, there are two different ways in which an IntermediateNode or the EndNode along a service path can detect an upstream failure in the service path:
(1) Each input OTU monitors its incoming optical signal for an LOS condition, indicating a failure in its immediate upstream link; and
(2) The DNOS monitors out-of-band signaling for an mtFault1 message, indicating that a failure occurred upstream of its immediate upstream link.

Depending on the implementation, an upstream failure may also be detected by monitoring an incoming optical signal for an AIS condition, indicating that a failure occurred upstream of its immediate upstream link. Depending on the number of nodes between the upstream node that originally detected the fault and a particular downstream node, fault detection at the downstream node may occur faster when an AIS condition is extracted by the OTU hardware than by the DNOS software monitoring the out-of-band channel for an mtFault1 message.

Figure 6:
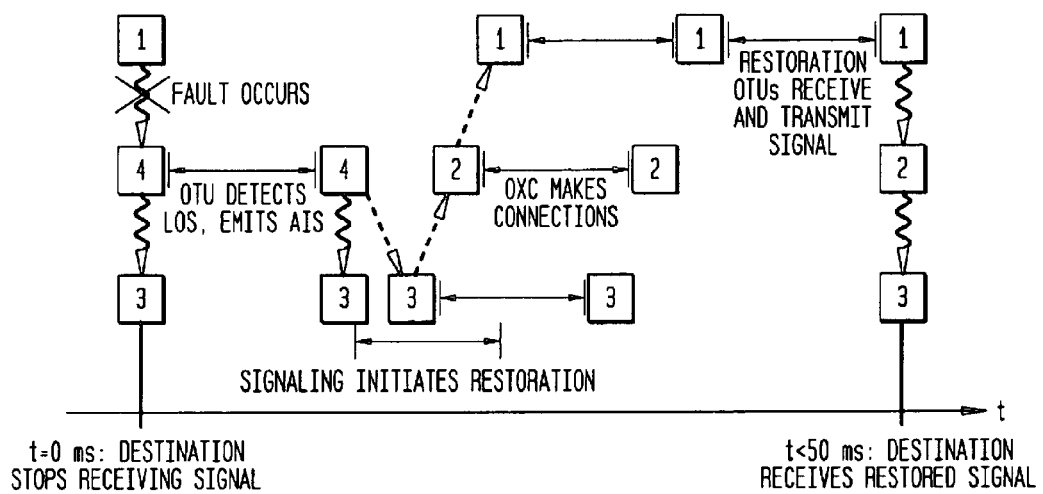
FIG. 6 shows a time line of the sequence of events that occur following a fault on link (14) on the channel used by the demand (1, 3) in the network of FIG. 4.

Referring again to FIG. 4, for purpose of the investigation, a fault was simulated by a mechanical switch on link (14) on the channel used by the demand (1, 3). FIG. 6 shows a time line of the sequence of events that occur following such a fault. In FIG. 6, payload transmission between nodes is indicated by a wavy arrow, out-of-band signaling between nodes is indicated by a broken arrow, and processing within a node is indicated by a horizontal solid arrow. Prior to the fault, in accordance with Table 1, the demand (1, 3) was satisfied by provisioning the service path (143).

The fault occurs on link (14) at time t=0 ms. The corresponding OTU at node 4 detects the LOS condition, injects AIS into the payload transmitted to node 3, and transmits an mtFault message to its DNOS at node 4. After receiving the mtFault message from its OTU, the DNOS at node 4 (an IntermediateNode along the service path (143) for the demand (1, 3)) transmits an mtFault1 message to its NextNode node 3.

The DNOS at node 3 (the EndNode for the demand (1, 3)) receives the out-of-band mtFault1 message from node 4, which triggers the initiation of restoration processing within node 3. In particular, node 3 transmits an out-of-band mtRestore message to its PreviousNode node 2 and proceeds to reconfigure its OXC for the restoration path (123).

Node 2 (an IntermediateNode along the restoration path (123) for the demand (1, 3)) receives the mtRestore message from node 3, passes the out-of-band miRestore message to its PreviousNode node 1, and proceeds to configure its OXC for the restoration path (123).

Node 1 (the StartNode for the demand (1, 3)) receives the out-of-band mtRestore message from node 2 and proceeds to reconfigure its OXC for the restoration path (123).

When the configuration of all of the OXCs for the restoration path (123) is complete, the restoration path is provisioned to satisfy the demand (1, 3) and the destination (node 3) begins to receive restored signal service by time t<50 ms.

Figure 7:
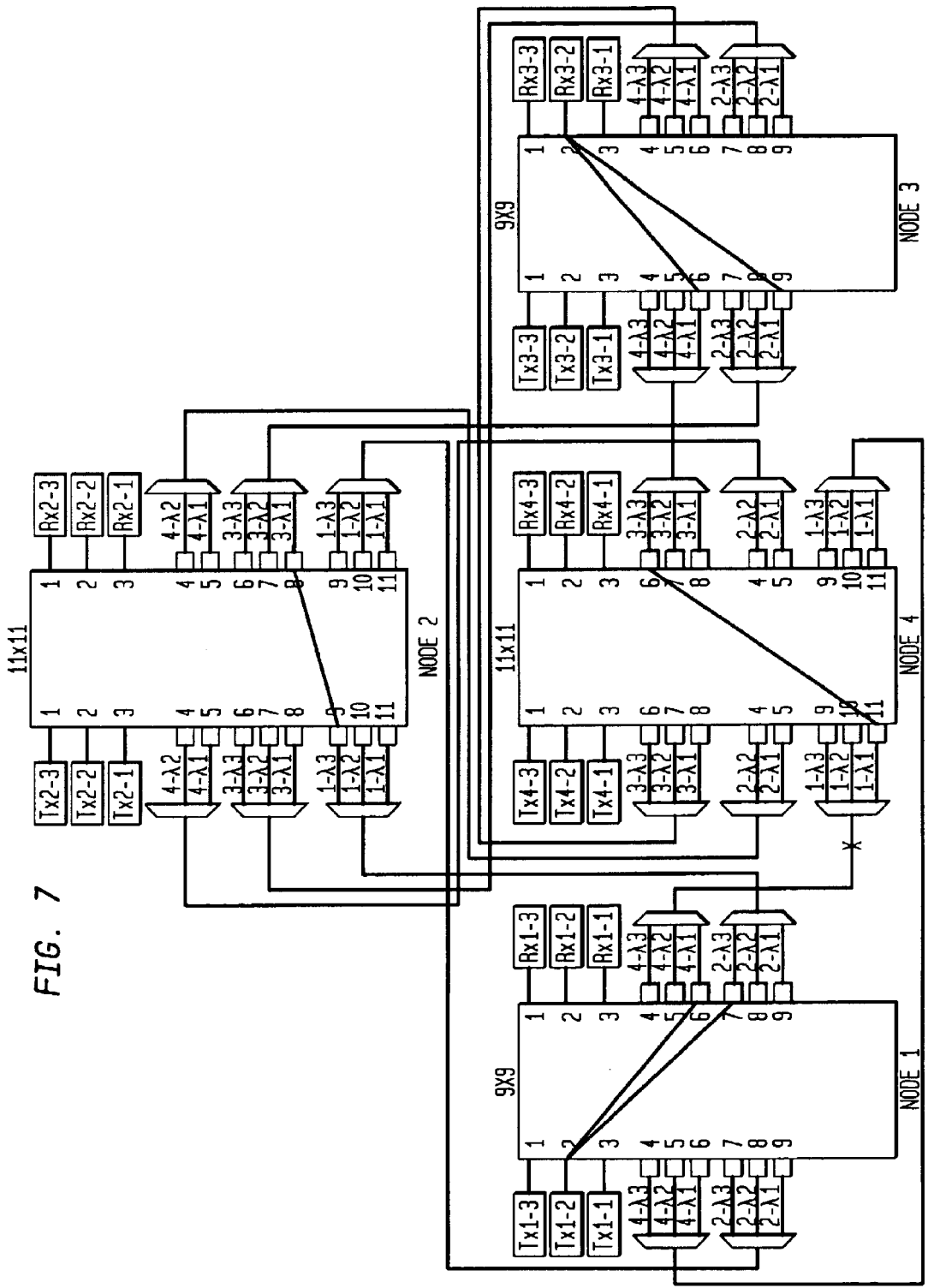
FIG. 7 shows the configurations of the network of FIG. 4 for the demand (1, 3) both before and after the failure detection and restoration processing of FIG. 6.

FIG. 7 shows the configurations of network 400 of FIG. 4 for the demand (1, 3) both before and after the failure detection and restoration processing of FIG. 6. Prior to the fault, input port 2 of the (9×9) OXC at node 1 is configured to output port 6, input port 11 of the (11×11) OXC at node 4 is configured to output port 6, and input port 6 at the (9×9) OXC at node 3 is configured to output port 2, which in combination provide the service path (143). After the fault occurs in the link (14) and after restoration processing is complete, input port 2 of the (9×9) OXC at node 1 is reconfigured to output port 7, input port 9 of the (11×11)

OXC at node 2 is configured to output port 8, and input port 9 at the (9×9) OXC a node 3 is reconfigured to output port 2, which in combination provide the restoration path (123).

A SONET test set was used to measure the duration of service disruption between fault and restoration of service. A $2^9-1$ pseudo random bit sequence encapsulated within SONET was transmitted between various nodes. No bit errors were observed before or after the restoration event. The total mean restoration time was measured to be 41±1 ms. Although the investigation was based on a four-node mesh network, the total restoration time is expected to stay below 100 ms for large-scale WDM mesh networks.

Although the present invention has been described in the context of SONET-based WDM mesh networks having all-optical switches, those skilled in the art will understand that the present invention can be implemented for other networks, including networks based on data protocols other than SONET, networks based on multiplexing schemes other than WDM, such as time-division multiplexing (TDM), networks having architectures other than mesh architectures, such as ring architectures, and networks other than those having all-optical switches, such as networks having cross-connects that operate in the electrical domain.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. At a node of a telecommunications network satisfying a demand from a start node to an end node, a method for automatically provisioning the network from a service path to a restoration path after a failure occurs in the service path, comprising the steps of:
   (a) receiving, at the node, an indication of the occurrence of the failure in the service path;
   (b) if the node is an intermediate node of the service path, then transmitting, by the node, a failure message to its next node along the service path;
   (c) if the node is the end node of the service path, then transmitting, by the node, a restore message to its previous node along the restoration path; and
   (d) if the node is an intermediate node of the restoration path, then transmitting, by the node, a restore message to its previous node along the restoration path, such that, upon the occurrence of the failure in the service path, where the restoration path comprises the start node, one or more restoration-path intermediate nodes that are not part of the service path, and the end node:
      upon receipt of the indication of the occurrence of the failure, the end node (1) transmits a failure message to a last restoration-path-intermediate node and (2) reconfigures its cross-connect to support the restoration path;
      upon receipt of the failure message from the end node, the last restoration-path intermediate node (1) transmits a failure message to its previous node along the restoration path and (2) reconfigures its cross-connect to support the restoration path;
      upon receipt of the failure message from a first restoration-path intermediate node, the start node reconfigures its cross-connect to support the restoration path, such that the demand is restored based on a sequence of communications in reverse direction along the restoration path from the end node to the start node.

2. The invention of claim 1, wherein the network is a WDM optical mesh network.

3. The invention of claim 1, wherein the failure message and the restore message are out-of-band messages transmitted by the node.

4. The invention of claim 1, wherein:
   the node comprises (1) a fault monitoring unit (FMU) configured to monitor service-path payload signals for the failure and (2) an operating system (OS) configured to control operations of the node; and
   the indication of the occurrence of the failure in the service path is a failure message transmitted by the FMU to the OS after the FMU detects the failure in the service path.

5. The invention of claim 4, wherein, when the node is an intermediate node along the service path, the node transmits an in-band alarm indication signal to its next node along the service path.

6. The invention of claim 1, wherein the node automatically configures its cross-connect in accordance with the provisioning of the network from the service path to the restoration path.

7. The invention of claim 6, wherein the node is the start node of the restoration path.

8. The invention of claim 1, wherein the indication of the occurrence of the failure in the service path is an out-of-band message transmitted to the node by another node in the network.

9. The invention of claim 8, wherein the out-of-band message is a failure message transmitted to the node by an intermediate node along the service path.

10. The invention of claim 8, wherein the out-of-band message is a restore message transmitted to the node by either the end node or an intermediate node along the restoration path.

11. The invention of claim 1, wherein the indication of the occurrence of the failure in the service path is an in-band alarm indication signal transmitted to the node by an intermediate node along the service path.

12. The invention of claim 11, wherein, when the node is an intermediate node along the service path, the node passes the in-band alarm indication signal to its next node along the service path.

13. The invention of claim 1, wherein:
the demand is a first unidirectional demand from the start node to the end node; and
the first unidirectional demand is restored without having to restore a second unidirectional demand corresponding to service from the end node of the first unidirectional demand to the start node of the first unidirectional demand.

14. A node for a telecommunications network, comprising:
(a) a cross-connect connected to a plurality of input ports and a plurality of output ports and configurable to connect incoming payload signals received at an input port to outgoing payload signals transmitted at an output port; and
(b) an operating system configured to receive an indication of an occurrence of a failure in a service path satisfying a demand from a start node to an end node, wherein, in order to automatically provision the network from the service path to a restoration path for the demand:
if the node is an intermediate node of the service path, then the operating system causes the node to transmit a failure message to its next node along the service path;
if the node is the end node of the service path, then the operating system causes the node to transmit a restore message to its previous node along the restoration path; and
if the node is an intermediate node of the restoration path, then the operating system causes the node to transmit a restore message to its previous node along the restoration path, such that, upon the occurrence of the failure in the service path, where the restoration path comprises the start node, one or more restoration-path intermediate nodes that are not part of the service path, and the end node;
upon receipt of the indication of the occurrence of the failure, the end node (1) transmits a failure message to a last restoration-path intermediate node and (2) reconfigures its cross-connect to support the restoration path;
upon receipt of the failure message from the end node, the last restoration-path intermediate node (1) transmits a failure message to its previous node along the restoration path and (2) reconfigures its cross-connect to support the restoration path;
upon receipt of the failure message from a first restoration-path intermediate node, the start node reconfigures its cross-connect to support the restoration path, such that the demand is restored based on a sequence of communications in reverse direction along the restoration path from the end node to the start node.

15. The invention of claim 14, wherein the network is a WDM optical mesh network.

16. The invention of claim 14, wherein the failure message and the restore message are out-of-band messages transmitted by the node.

17. The invention of claim 14, wherein the node further comprises a fault monitoring unit (FMU) configured to monitor service-path payload signals for the failure, wherein the indication of the occurrence of the failure in the service path is a failure message transmitted by the FMU to the OS after the FMU detects the failure in the service path.

18. The invention of claim 17, wherein, when the node is an intermediate node along the service path, the node transmits an in-band alarm indication signal to its next node along the service path.

19. The invention of claim 14, wherein the node automatically configures the cross-connect in accordance with the provisioning of the network from the service path to the restoration path.

20. The invention of claim 19, wherein the node is the start node of the restoration path.

21. The invention of claim 14, wherein the indication of the occurrence of the failure in the service path is an out-of-band message transmitted to the node by another node in the network.

22. The invention of claim 21, wherein the out-of-band message is a failure message transmitted to the node by an intermediate node along the service path.

23. The invention of claim 21, wherein the out-of-band message is a restore message transmitted to the node by either the end node or an intermediate node along the restoration path.

24. The invention of claim 14, wherein the indication of the occurrence of the failure in the service path is an in-band alarm indication signal transmitted to the node by an intermediate node along the service path.

25. The invention of claim 24, wherein, when the node is an intermediate node along the service path, the node passes the in-band alarm indication signal to its next node along the service path.

26. The invention of claim 14, wherein:
the demand is a first unidirectional demand from the start node to the end node; and
the first unidirectional demand is restored without having to restore a second unidirectional demand corresponding to service from the end node of the first unidirectional demand to the start node of the first unidirectional demand.

* * * * *